United States Patent
Katzenberger et al.

(10) Patent No.: US 12,328,049 B2
(45) Date of Patent: Jun. 10, 2025

(54) SLOT WEDGE FOR A STATOR OF A DYNAMO-ELECTRIC MACHINE

(71) Applicant: Innomotics GmbH, Nuremberg (DE)

(72) Inventors: Tobias Katzenberger, Bad Königshofen STT Unteressfeld (DE); Bastian Plochmann, Neustadt an der Aisch (DE)

(73) Assignee: Hottinger Brüel & Kjaer GmbH, Darmstadt (DE)

( * ) Notice: Subject to any disclaimer, the term of this patent is extended or adjusted under 35 U.S.C. 154(b) by 263 days.

(21) Appl. No.: 18/016,608

(22) PCT Filed: Jul. 14, 2021

(86) PCT No.: PCT/EP2021/069635
§ 371 (c)(1),
(2) Date: Jan. 17, 2023

(87) PCT Pub. No.: WO2022/023043
PCT Pub. Date: Feb. 3, 2022

(65) Prior Publication Data
US 2023/0291266 A1    Sep. 14, 2023

(30) Foreign Application Priority Data
Jul. 28, 2020    (EP) .................... 20188126

(51) Int. Cl.
*H02K 3/48* (2006.01)
*H02K 3/487* (2006.01)
*H02K 15/12* (2006.01)

(52) U.S. Cl.
CPC ............. *H02K 3/487* (2013.01); *H02K 15/12* (2013.01)

(58) Field of Classification Search
CPC ........ H02K 15/12; H02K 3/487; H02K 13/48; H02K 3/34; H02K 3/345
See application file for complete search history.

(56) References Cited

U.S. PATENT DOCUMENTS 3,976,901 A  *  8/1976  Liptak ..................... H02K 3/48
                                                         310/214
4,117,362 A  *  9/1978  Tsirkin .................. H02K 3/487
                                                         310/214

(Continued)

FOREIGN PATENT DOCUMENTS

| DE | 10 2018 202 945 A1 | 8/2019 |
|---|---|---|
| EP | 2 824 801 A1 | 1/2015 |
| JP | S61203845 A | 9/1986 |

OTHER PUBLICATIONS

PCT International Search Report and Written Opinion of International Searching Authority mailed Oct. 19, 2021 corresponding to PCT International Application No. PCT/EP2021/069635 filed Jul. 14, 2021.

*Primary Examiner* — Leda T Pham
(74) *Attorney, Agent, or Firm* — Henry M. Feiereisen LLC

(57) ABSTRACT

A slot wedge of a dynamoelectric machine which includes a stator having axially extending slots and a winding system disposed in the slots, is configured to cover a corresponding one of the slots in a direction of an air gap and includes a first layer, and a second layer arranged in spaced-apart to the first layer at least in one section to form a flow channel between the first and second layers. The second layer can have a perforation with a different density of holes per unit area, with the density of the holes being greater in a central area of the second layer and/or a perforation having holes defined by a diameter which is greater in a central area of the slot.

18 Claims, 3 Drawing Sheets

(56) References Cited

U.S. PATENT DOCUMENTS

| | | | |
|---|---|---|---|
| 6,580,192 B2 * | 6/2003 | Murayama | H02K 3/487 310/214 |
| 2008/0203844 A1 | 8/2008 | Klaussner | |
| 2016/0156241 A1 | 6/2016 | Grubel et al. | |
| 2021/0036571 A1 | 2/2021 | Eckstein et al. | |

* cited by examiner

SLOT WEDGE FOR A STATOR OF A DYNAMO-ELECTRIC MACHINE

CROSS-REFERENCES TO RELATED APPLICATIONS

This application is the U.S. National Stage of International Application No. PCT/EP2021/069635, filed Jul. 14, 2021, which designated the United States and has been published as International Publication No. WO 2022/023043 A1 and which claims the priority of European Patent Application, Serial No. 20188126.5, filed Jul. 28, 2020, pursuant to 35 U.S.C. 119(a)-(d).

BACKGROUND OF THE INVENTION

The invention relates to a slot wedge, a stator, a dynamo-electric machine and a method for impregnating a stator of a dynamoelectric machine.

Dynamoelectric machines have a winding system in their slots which, when energized, generates a magnetic field and produces motion due to electromagnetic interaction with corresponding machine parts.

The winding system in the slots and/or the winding overhangs is filled or provided with insulating resin and then cured. This impregnation serves to fill voids in the dielectric and in the heat flow paths, thereby preventing glow discharges and reducing thermal resistance. The impregnation also serves to mechanically strengthen the material.

In the manufacture of a low-voltage electric motor (industrial motors or E-mobility motors up to 1 kV), impregnation with liquid reactive resin and subsequent curing of the same is a very time-consuming and costly process compared to the other manufacturing steps, such as winding, drawing-in, phase separation. It often involves large dip impregnation stations. The impregnation process itself is an integral process, wherein many shaft heights and sizes are subject to one immersion and/or temperature profile. This makes it almost impossible to obtain individual optimization of the impregnation parameters to one type of motor.

The so-called trickle method is known as an impregnation method for very defined impregnation processes, wherein high-precision dispensing systems are used to apply the liquid resin to the rolling stator. Preheating of the stator produces a reduction in the viscosity of the resin, thereby promoting the incipient capillary effect and causing the stator slot to gradually fill with resin.

For applying the resin to the rolling stator, a number of parameters must be taken into account in order to ensure an optimum and, above all, sufficient resin flow into the slots, i.e. to ensure that the impregnation medium flows to the axial center of the slot even in the case of axially longer laminated cores, and that it only gels there. This is particularly important when using two-component liquid resins, which have a relatively fast gel time, as this causes a viscosity limit to be exceeded within a short time even at low temperatures, thereby significantly reducing the flowability of the substance. On the other hand, this effect is desirable in order to obtain a drip-free stator quickly, but therefore places particular requirements on the flowability of the resin and the absorption capacity of the stator.

Due to the high variability of low-voltage motors (different shaft heights, shaft lengths, winding types, wire diameters, etc.), the dispensed resin of a trickle system encounters a wide variety of substrates, all of which must ensure this minimum absorption capacity in order to ultimately guarantee sufficient operational reliability of the dynamoelectric machines.

In particular, different types and quantities of sheet insulation materials (for example phase separators) can constitute barriers inside the slot that prevent the resin from optimally flowing into the winding. These sheet insulation materials (for example Nomex papers, multilaminates of PET film and aramid fabric) are planar layers that cannot be penetrated by the resin but force the resin to flow around them. This effect also slows down penetration into the slot and may even prevent complete slot filling.

Poor flow behavior into the slot can conventionally be reduced by modifying the resin. The resin chemistry can be modified to make the material more fluid and also possibly have a delayed gel point, so that the material can flow more quickly around flow barriers and long slot bars.

However, reducing the viscosity is often no longer possible from a chemical, technical point of view, or is no longer desirable or even permitted within the framework of health and safety regulations, since lower viscosities are often obtained using shorter molecular chain lengths and/or reactive diluents.

In both areas, modern reactive resins have now reached the limit in terms of health policy. A delayed gel point is basically technically possible, but counterproductive from an economic point of view, as it increases cycle times and/or the energy costs for curing the resin.

Optimization of the sheet insulation materials is also possible in principle, but only effective for better absorption of the resin at the winding overhead or slot exit. Long slots and thus long flow paths cannot be optimized efficiently in this case.

Against this background, the object of the invention is to improve impregnation subject to the above parameters and to provide a stator and a dynamoelectric machine with reliable impregnation.

This object is achieved by a slot wedge of a dynamoelectric machine, said wedge having a first layer and a second layer which are spaced apart from one another at least in some sections so that a channel is formed therebetween.

SUMMARY OF THE INVENTION

The object is also achieved by a stator with a hollow-cylindrical, magnetically conductive body having on its inner or outer circumferential surface essentially axially extending, partially open slots in which a winding system is disposed and which are closed by a slot wedge according to the invention.

The object is also achieved by dynamoelectric machine with a stator having a slot wedge according to the invention.

The object is also achieved by a method of manufacturing/impregnating a stator having a hollow-cylindrical magnetically conductive body which has on its inner or outer circumferential surface essentially axially extending partially open slots in which a winding system is disposed, by way of the following steps:
  inserting an at least sectionally axially double-layered slot wedge into the slot to close off the slot interior such that it overlaps with a slot insulation,
  resin inflow into the axial interior of the slots via the end faces of the slots and via the flow channels of the slot wedge.

According to the invention, a slot wedge is now of double-layer design. In other words, the slot wedge has two layers spaced apart from one another and forming a flow channel so that the resin reaches its respective destination in the slot without any barriers.

The slot wedge is considered as being a sheet insulation material which is implemented as a strip, particularly in the case of fed-in windings, and which positions the winding in the slots.

When the winding is drawn into the laminated core, sheet insulation materials are also introduced into the slots. A so-called slot box is used as the slot lining. This is a folded sheet insulation material whose cross-sectional shape is ideally matched to the profile of the slot and abuts the slot wall. The slot lining forms an additional two-dimensional electrical barrier between the winding system, in particular the copper winding in the form of enameled wire, and a magnetically conductive body such as a laminated core.

After the winding has been drawn in, the slot is sealed with a slot wedge according to the invention, which also consists of a folded sheet insulation material and has two important functions thus far. First, it provides the necessary clearance and creepage distances, as the slot wedge and slot box overlap at the edges. Second, the slot box is wedged with the slot tooth, thereby mechanically fixing the winding in the slot so that no individual wires can slip back through the slot into the region of the air gap or the rotor. Together with the slot box, the slot wedge forms a main channel which is filled with reactive resin during the impregnation process and contains the copper winding.

One or more efficient flow channels for inflowing resins are additionally formed for each slot via the slot wedge according to the invention which is of double-layer design at least when viewed axially, allowing the liquid medium to flow into the center of the slot and distribute itself there without capillary-preventing or flow-preventing insulating materials, wire crossings or long and also very narrow flow paths.

In an advantageous embodiment, the flow conduits are formed by corrugation of a layer, and/or perforations are present in a layer—the layer facing the winding system—which ensure or at least promote a predeterminable distribution of the resin within the axial length of the slot.

In this case, a type of flow channel is created by a double layer of the slot wedge, having its openings at the axial slot outlet in each case. The inner layer of the slot wedge can be perforated, i.e. provided with exit holes, or split in two, with a non-flush joint in the middle of the sheet. The slot wedge itself could be "corrugated" on one side in the longitudinal or axial direction, so that a flow conduit that is as defined as possible is created, in particular toward the center of the slot.

A second layer of the slot wedge projecting further axially outward, possibly with a slight fold, provides an improved absorption effect of the resin as it is trickled onto the inner radius of the slot exit. This again ensures improved flow into the "flow channel".

In the case of long laminated cores, insertion of the slot wedge is typically a manual production process. Thus, insertion of the double-layer slot wedge does not represent any significant additional time overhead for production and can therefore be implemented cost-effectively.

However, integrating the double slot wedge into the automated drawing-in process is also technically conceivable. Folding, perforation and corrugation of sheet insulation materials can be realized cost-effectively for bulk goods.

Both the inner and outer layers could be used in corrugated form in order, among other things, to exploit logistical synergies for the manual workstations. This would mean that only one material would be required as bulk goods.

The corrugation has only a low effect on the flow behavior of the resins, but is positive with regard to the mechanical strengthening of the copper wires and can prevent wire crossings, at least on the innermost winding layers.

In an impregnation process, the winding system is filled or provided with insulating resin in the slots and/or the winding overhang and then cured. The impregnation serves to fill cavities in the dielectric and in the heat flow paths. This prevents glow discharges and reduces thermal resistance. In addition, impregnation serves to mechanically strengthen the material.

The slot wedge according to the invention reduces the impregnation times of the stator and also provides high-quality impregnation of the stator and thus of a dynamo-electric machine, which can ensure reliable operation of the dynamoelectric machine.

BRIEF DESCRIPTION OF THE DRAWING

The invention, as well as other advantageous embodiments of the invention, will be explained in more detail in the accompanying schematic drawings in which.

DETAILED DESCRIPTION OF PREFERRED EMBODIMENTS

Figure 1:
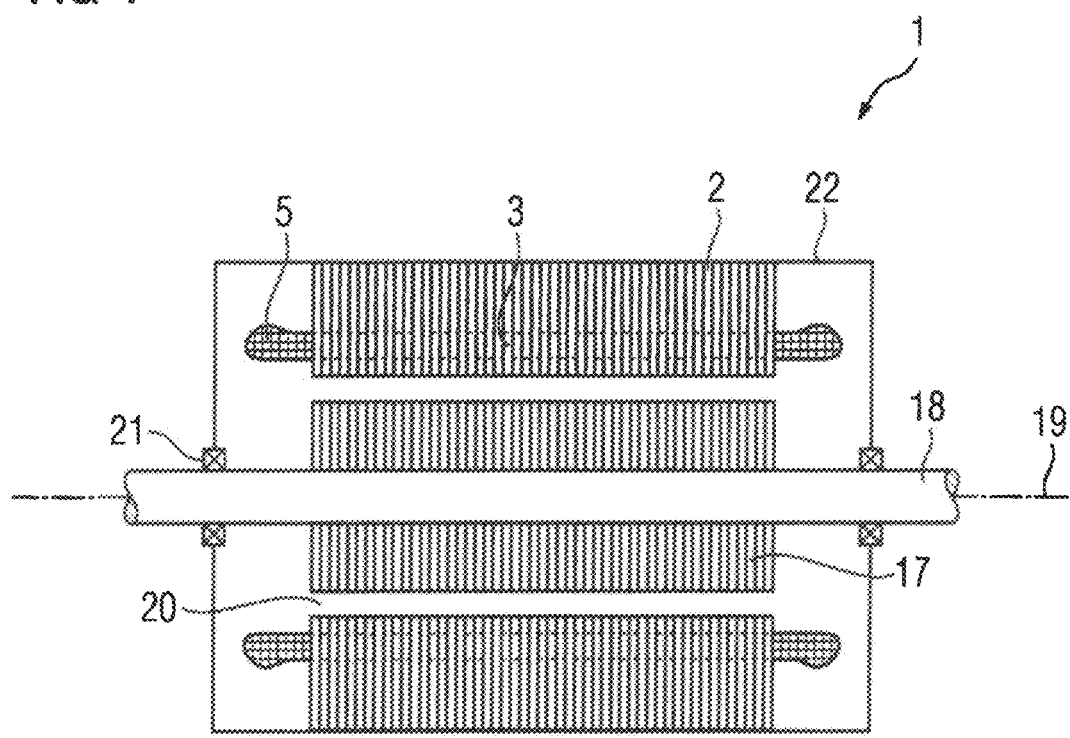
FIG. 1 shows a longitudinal section through an electric machine.

FIG. 1 shows a longitudinal section through a dynamo-electric machine 1 comprising a stator 2 having axially extending slots 3 in which a winding system 5 is disposed. Across an air gap 20, the energized stator 2 enters into magnetic interaction with a rotor 17, which causes the shaft 18 to rotate about an axis 19. The dynamoelectric machine 1 is enclosed by a housing 22 which is supported on the shaft 18 by bearings 21.

When the winding system 5 is drawn into the slots 3 of a laminated core of the stator 2, sheet insulation materials are also introduced into the slots 3. The so-called slot box serves as the slot lining, this being a folded sheet insulation material whose cross-sectional shape is ideally matched to the shape of the slot and abuts the slot wall. The slot lining or slot insulation 4 forms an additional planar electrical barrier between the winding system 5, in particular a copper winding implemented as enameled wire, and a magnetically conductive body, for example a laminated core.

In the production of a low-voltage electric motor of this kind as typical industrial motors or E-mobility motors up to 1 kV, impregnation of the winding system 5 with liquid reactive resin and subsequent curing of the same is a very time-consuming and costly process compared to the other production steps of the winding system 5 such as winding, drawing-in, phase separation, etc.

In order to obtain a defined impregnation process of the winding system 5, the trickle method is used, among others, wherein high-precision dispensing equipment is used to apply the liquid resin to the rolling stator 2.

Preheating of the stator 2 produces a reduction in the viscosity of the resin, which promotes the incipient capillary effect and causes the slot 3 of the stator 2 to gradually fill with resin.

For applying the resin, in particular to a rolling stator 2, a number of parameters must be taken into account in order to ensure an optimum and, above all, sufficient flow of resin into the slots 3, i.e. to ensure that the impregnating medium flows to the axial and/or radial center of the slot 3 even in the case of axially longer laminations, and only gels there.

This is particularly important when using two-component liquid resins which have a relatively fast gel time, since this causes a viscosity limit to be exceeded within a short time, even at low temperatures, thereby significantly reducing the flowability of the substance.

Figure 2:
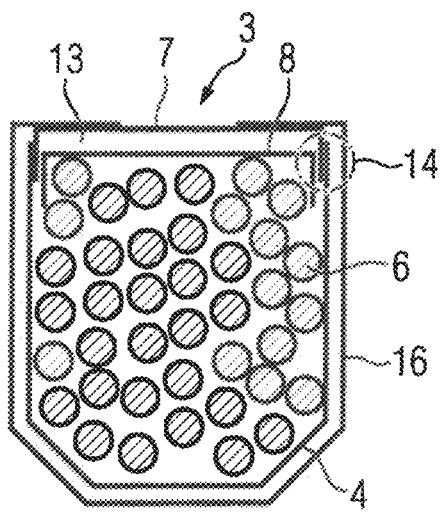
FIG. 2 shows a cross-section through a slot.

FIG. 2 shows a cross-sectional view of a slot 3 of the dynamoelectric machine 1, having a winding system 5 consisting of round wires 6. Other electrical conductors with other cross-sections may likewise be inserted in the slot 3. The inside of the slot 3 is provided with a slot insulation 4. A slot wedge 9 according to the invention, having a first layer 7 and a second layer 8, covers the slot 3 in the direction of the air gap 20. The first layer 7 is disposed directly on the slot, facing the air gap 20 of the dynamoelectric machine 1. The second layer 8 is spaced radially apart from the first layer 7, thereby forming an axial channel. An overlap with the slot insulation 4 is formed such that the slot wedge 9 is disposed at least partly within the slot insulation 4.

Figure 3:
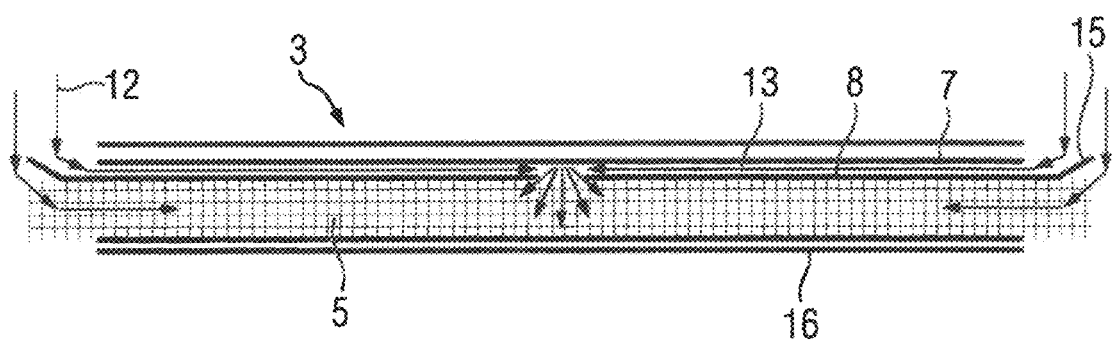
FIG. 3 shows a longitudinal section through a slot during resin filling.

FIG. 3 shows the main resin flow 12 in a slot wedge 9 according to the invention during filling. In this case, resin is supplied axially to the winding system from both sides. In order to obtain a sufficient quantity of resin in the winding system 5, especially in the central area of slot 3, resin is also brought into the "critical" areas of the winding system via the flow channels 13 of the slot wedge 9. This is particularly advantageous when using a two-component liquid resin having a relatively fast gel time. The viscosity limit is not exceeded so quickly even at low temperatures, thereby increasing the flow range.

This is achieved, for example, by the slot wedge 9 having an axially continuous first layer 7 but a discontinuous second layer 8. Resin can now flow across this gap in the second layer 8, particularly in the central area. The second layers 8 are not therefore flush against each other.

The slot wedge 9 according to the invention thus ensures comparatively better or optimum filling, particularly of the center of the slot 3. Without this slot wedge 9, the resin would first have to pass through the complete winding system 5, in particular the complete copper winding, to the center of slot 3, and without gelling too early. If the resin gels prematurely, the center of slot 3 will not be filled with resin.

By means of the slot wedge, also known as a resin pipe, the resin is now fed precisely into this slot center.

Various types and quantities of sheet insulation materials (for example phase separators) constitute barriers that prevent the resin from flowing optimally into the winding system 5.

These sheet insulation materials (for example Nomex papers, multilaminates of PET film and aramid fabric) are planar layers which cannot be penetrated but force the resin to flow around them. The barriers are now "bypassed" by the slot wedge 9 according to the invention.

The long pathway of the resin via the winding system 5 and/or the sheet insulation materials to the center of the slot 3 is thus "bypassed".

Figure 5:
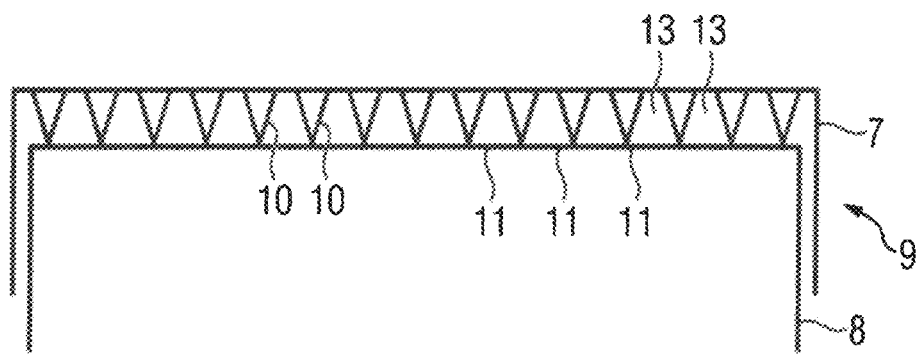

The rapid guiding of the resin flow 12 into the slot 3, into the center of the slot and/or also other positions within the axial extent of the slot 3 is also ensured by means of a perforation 11 of the second layer 8 as shown in FIG. 5. This perforation 11 can be uniformly distributed over the surface of the second layer 8, and likewise the second layer 8 can also have a different density of holes per unit area. In this case, the density of the holes is greater in the central area of the layer 8. Likewise, the diameter of the holes of the perforation 11 can also, or complementarily, be adapted to suit the desired resin flow, so that the larger holes are disposed in the center of the slot 3.

Figure 4:
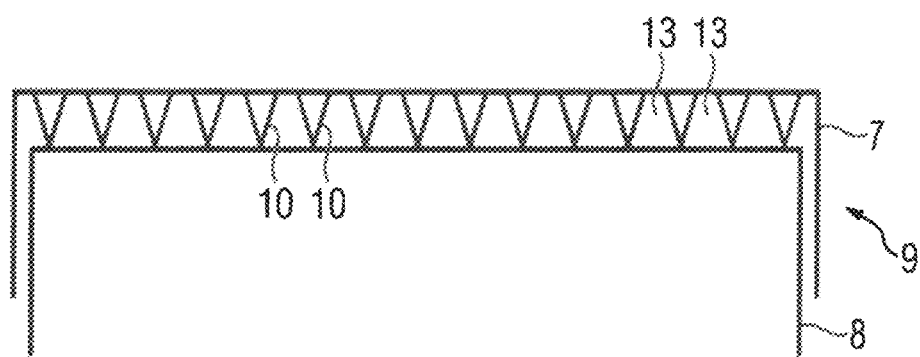
FIGS. 4 and 5 show cross-sections of different slot wedges.

FIG. 4 and FIG. 5 show corrugations 10 of the first layer 7 which are aligned with the second layer 8 and divide the flow channel 13 into a plurality of parallel smaller channels, not necessarily of the same size. In particular, a certain number of the holes are assigned to the respective smaller channels.

What is claimed is:

1. A slot wedge of a dynamoelectric machine which comprises a stator including axially extending slots and a winding system disposed in the slots, said slot wedge configured to cover a corresponding one of the slots in a direction of an air gap and comprising:
   a first layer; and
   a second layer arranged in spaced-apart relation to the first layer at least in one section to form a flow channel between the first and second layers, said second layer having a perforation with a different density of holes per unit area, with the density of the holes being greater in a central area of the second layer and/or a perforation having holes defined by a diameter which is greater primarily in a central area of the slot.

2. The slot wedge of claim 1, wherein at least one of the first and second layers has a corrugation.

3. The slot wedge of claim 2, wherein the corrugation extends in an axial direction.

4. The slot wedge of claim 1, wherein the first layer has a corrugation which is directed toward the second layer.

5. The slot wedge of claim 1, wherein the second layer has a corrugation, which is directed toward the slot and/or the first layer.

6. A slot wedge of a dynamoelectric machine which comprises a stator including axially extending slots and a winding system disposed in the slots, said slot wedge configured to cover a corresponding one of the slots in a direction of an air gap and comprising:
   a first layer; and
   a second layer arranged in spaced-apart relation to the first layer at least in one section to form a flow channel between the first and second layers, said second layer being divided in two with a non-flush joint so as to form a gap via which resin is able to flow primarily into a central area of a slot.

7. The slot wedge of claim 6, wherein at least one of the first and second layers has a corrugation.

8. The slot wedge of claim 7, wherein the corrugation extends in an axial direction.

9. The slot wedge of claim 6, wherein the first layer has a corrugation which is directed toward the second layer.

10. The slot wedge of claim 6, wherein the second layer has a corrugation, which is directed toward the slot and/or the first layer.

11. A stator, comprising:
   a hollow-cylindrical magnetically conductive body having essentially axially extending, partially open slots on an inner surface or outer circumferential surface of the body;
   a winding system disposed in the slots; and
   a slot wedge configured to close a corresponding one of the slots, said slot wedge configured in one of two ways, a first way in which the slot wedge comprises a first layer and a second layer which are spaced-apart from one another at least in one section to form a flow channel between the first and second layers, said second layer having a perforation with a different density of holes per unit area, with the density of the holes being greater in a central area of the second layer and/or a perforation having holes defined by a diameter which is greater primarily in a central area of the slot, a second way in which the slot wedge comprises a first layer and a second layer which are spaced-apart from one another at least in one section to form a flow channel between the first and second layers, said second layer being divided in two with a non-flush joint so as to form a gap via which resin is able to flow primarily into a central area of a slot.

12. The stator of claim 11, wherein at least one of the first and second layers of the slot wedge has a corrugation.

13. The stator of claim 12, wherein the corrugation extends in an axial direction.

14. The stator of claim 11, wherein the first layer of the slot wedge has a corrugation which is directed toward the second layer.

15. The stator of claim 11, wherein the second layer of the slot wedge has a corrugation, which is directed toward the slot and/or the first layer.

16. A dynamoelectric machine, comprising a stator as set forth in claim 11.

17. A method for manufacturing a stator which comprises a hollow-cylindrical magnetically conductive body having essentially axially extending, partially open slots on an inner surface or outer circumferential surface of the body, and a winding system disposed in the slots, said method comprising:

positioning a first layer and a second layer such that the first layer and the second layer are spaced apart from each other at least in one section to form a flow channel there between for producing an axial slot wedge;

inserting the axial slot wedge to cover a corresponding one of the partially open slots in a direction of an air gap and to close off an axial interior space of the slot such that the slot wedge overlaps with a slot insulation disposed on an inside of the slot; and inflowing resin via end faces of the slot and via the flow channel of the slot wedge into the axial interior space of the slot such that the resin travels via perforations in the second layer primarily in a central area of the slot.

18. A method for manufacturing a stator which comprises a hollow-cylindrical magnetically conductive body having essentially axially extending, partially open slots on an inner surface or outer circumferential surface of the body, and a winding system disposed in the slots, said method comprising:

positioning a first layer and a split second layer such that the first layer and the split second layer are spaced apart from each other at least in one section to form a flow channel there between for producing an axial slot wedge;

inserting the axial slot wedge to cover a corresponding one of the partially open slots in a direction of an air gap and to close off an axial interior space of the slot such that the slot wedge overlaps with a slot insulation disposed on an inside of the slot; and inflowing resin via end faces of the slot and via the flow channel of the slot wedge into the axial interior space of the slot such that the resin travels via a non-flush joint in the second layer primarily in a central area of the slot.

* * * * *

UNITED STATES PATENT AND TRADEMARK OFFICE
CERTIFICATE OF CORRECTION

| | | |
|---|---|---|
| PATENT NO. | : 12,328,049 B2 | Page 1 of 1 |
| APPLICATION NO. | : 18/016608 | |
| DATED | : June 10, 2025 | |
| INVENTOR(S) | : Tobias Katzenberger and Bastian Plochmann | |

It is certified that error appears in the above-identified patent and that said Letters Patent is hereby corrected as shown below:

On the Title Page

Item (73) Assignee:
Replace "Hottinger Brüel & Kjaer GmbH, Darmstadt (DE)" with the correct assignee name
--Innomotics GmbH, Nuremberg (DE)--.

Signed and Sealed this
Thirtieth Day of September, 2025

John A. Squires
*Director of the United States Patent and Trademark Office*